(12) United States Patent
Larsson et al.

(10) Patent No.: US 9,001,674 B2
(45) Date of Patent: Apr. 7, 2015

(54) METHOD OF SENSING

(75) Inventors: Peter Larsson, Solna (SE); Yngve Selén, Uppsala (SE); Mikael Prytz, Rönninge (SE)

(73) Assignee: Optis Cellular Technology, LLC, Plano, TX (US)

( * ) Notice: Subject to any disclaimer, the term of this patent is extended or adjusted under 35 U.S.C. 154(b) by 251 days.

(21) Appl. No.: 13/129,149

(22) PCT Filed: Mar. 23, 2009

(86) PCT No.: PCT/SE2009/050305
§ 371 (c)(1),
(2), (4) Date: May 13, 2011

(87) PCT Pub. No.: WO2010/056181
PCT Pub. Date: May 20, 2010

(65) Prior Publication Data
US 2011/0228693 A1 Sep. 22, 2011

Related U.S. Application Data

(60) Provisional application No. 61/114,786, filed on Nov. 14, 2008.

(51) Int. Cl.
*H04W 24/00* (2009.01)
*H04W 72/02* (2009.01)
(Continued)

(52) U.S. Cl.
CPC .......... *H04W 72/02* (2013.01); *H04W 72/0406* (2013.01); *H04W 72/085* (2013.01); *H04W 84/18* (2013.01)

(58) Field of Classification Search
CPC ............ H04W 72/02; H04W 72/0406; H04W 72/085; H04W 84/18
USPC ................................... 370/252, 329, 431–463
See application file for complete search history.

(56) References Cited

U.S. PATENT DOCUMENTS 7,738,859 B2    6/2010  Roy et al.
8,126,488 B2 *  2/2012  Albert et al. .................. 455/502
(Continued)

FOREIGN PATENT DOCUMENTS

JP    2006-526323 A    11/2006
JP    2008-011387 A    1/2008
(Continued)

OTHER PUBLICATIONS

International Search Report corresponding to PCT Application No. PCT/SE2009/050305, Date of Mailing: Jul. 20, 2009.
Written Opinion of the International Searching Authority corresponding to PCT/SE2009/050305 Date of Mailing: Jul. 20, 2009.
(Continued)

*Primary Examiner* — Khaled Kassim
*Assistant Examiner* — Zhaohui Yang
(74) *Attorney, Agent, or Firm* — Vincent J. Allen; Austin C. Teng; Carstens & Cahoon, LLP

(57) ABSTRACT

Wireless nodes for use in a radio system are provided. A wireless node for use in a radio system may include a transmit and receive unit configured to request sensing information of at least one radio resource from at least one other wireless node of the radio system, and to receive the sensing information of the at least one radio resource from the at least one other wireless node of the radio system. The wireless node may include a sensing unit configured to determine whether a particular radio resource among the at least one radio resource is free to use based on the sensing information received from the at least one other wireless node. Related methods are also provided.

21 Claims, 5 Drawing Sheets

→ Measurement request / sensing data message to/ from node v

HC = Hop counter

(51) Int. Cl.
*H04W 72/04* (2009.01)
*H04W 72/08* (2009.01)
*H04W 84/18* (2009.01)

(56) References Cited

U.S. PATENT DOCUMENTS

| | | | |
|---|---|---|---|
| 2004/0203967 A1* | 10/2004 | Yamaguchi et al. | 455/509 |
| 2007/0097895 A1* | 5/2007 | Keshavarzian et al. | 370/311 |
| 2008/0009289 A1* | 1/2008 | Kashima et al. | 455/436 |
| 2008/0198948 A1* | 8/2008 | Tang | 375/316 |
| 2008/0214130 A1* | 9/2008 | Park et al. | 455/161.3 |
| 2008/0225789 A1* | 9/2008 | Kim et al. | 370/329 |
| 2008/0268895 A1* | 10/2008 | Foxenland | 455/550.1 |
| 2009/0247201 A1* | 10/2009 | Ye et al. | 455/509 |
| 2009/0325482 A1* | 12/2009 | Zhou et al. | 455/25 |
| 2010/0003922 A1* | 1/2010 | Zhou et al. | 455/67.11 |
| 2010/0062718 A1* | 3/2010 | Zhou et al. | 455/67.11 |

FOREIGN PATENT DOCUMENTS

| | | |
|---|---|---|
| JP | 2008-079280 A | 4/2008 |
| JP | 2008-533835 A | 8/2008 |
| WO | WO 2004/100450 A1 | 11/2004 |

OTHER PUBLICATIONS

Notification of Transmittal of the International Preliminary Report on Patentability corresponding to PCT/SE2009/050305, Date of Completion: Feb. 11, 2011.
Jia et al. "HC-MAC: A Hardware-Constrained Cognitive MAC for Efficient Spectrum Management" IEEE Journal on Selected Areas in Communication 26:1, pp. 106-117, Jan. 1, 2008.
Sethi et al. "Hammer Model Threat Assessment of Cognitive Radio Denial of Service Attacks" New Frontiers in Dynamic Spectrum Access Networks, 3$^{rd}$ IEEE Symposium, Piscataway, New Jersey, pp. 1-12, Oct. 14, 2008.
Ghasemi A. et al., "Opportunistic Spectrum Access in Fading Channels Through Collaborative Sensing", *Journal of Communications*, vol. 2, No. 2, Mar. 2007, pp. 71-82.
Huguenin K., "A Distributed Algorithm for Collaborative Adaptive Sensing", 2007.
Japanese Office Action Corresponding to Japanese Patent Application No. 2011-536283; Mailing Date: Jan. 22, 2013, 3 Pages (Foreign Text Only).
Mishra S.M. et al., "Cooperative Sensing among Cognitive Radios", *In Proc. of the IEEE International Conference on Communications*, 2006.

* cited by examiner

METHOD OF SENSING

CROSS REFERENCE TO RELATED APPLICATIONS

This application is a 35 U.S.C. §371 national stage application of PCT International Application No. PCT/SE2009/050305, filed on 23 Mar. 2009, which claims the benefit of priority of U.S. Provisional Application No. 61/114,786, filed 14 Nov. 2008. The above-referenced PCT International Application was published in the English language as International Publication No. WO 2010/056181 on 20 May 2010. The disclosures of both of the above referenced applications are hereby incorporated herein in their entireties by reference.

TECHNICAL FIELD

The present invention relates to a method and a device for performing sensing in a radio system. In particular the present invention relates to a method and a device for performing sensing in a radio system employing opportunistic spectrum access.

BACKGROUND

Recent research has shown that usage of the radio spectrum is often fairly inefficient. One key factor in this is the current spectrum licensing regime. That is, some part of the radio spectrum is licensed to a party, such as an operator of a radio communications system, who is given an exclusive right to use this part of the radio spectrum. For example, even though significant parts of the useful spectrum is licensed, several measurements (see, e.g. T. Erpek, K. Steadman, D. Jones, "Spectrum Occupancy Measurements: Dublin, Ireland, Collected On Apr. 16-18, 2007", Shared Spectrum Company Report, 2007) indicate that some parts of this spectrum are highly underutilized. Therefore, a more flexible use of the radio spectrum has become a research intensive subject within which the aim is at optimizing, i.e. maximizing, the usage of the available radio spectrum.

To address the above-indicated issues, the FCC (Federal Communications Commission) took, in 2005, an initiative to open up for so-called secondary use of the spectrum. That is, radio resources that, e.g. under a license, are owned by one party—the primary party—may also be used by others (secondary users) for purposes (secondary use) that do not fall within the operation (primary use) of the primary party. Consequently, a secondary user may use radio resources owned by the primary party without having a license and without having made an explicit agreement with the primary party. A requirement for accessing radio resources as a secondary user is that the primary party should not be exposed to harmful interference caused by the secondary use. Therefore a secondary user is allowed to transmit over radio resources owned by the primary party if it can be ensured that the primary party is, for all practical purposes, not affected.

In order to determine when a secondary user can transmit without negatively affecting the primary user some kind of mechanism must be provided. Thus, secondary users should be allowed and the mechanism should enable secondary users to access primary users' spectrum when no primary user's communication quality is (substantially) affected. One approach for assessing the (instantaneous) primary usage of spectrum is to perform sensing, i.e., using sensors (radio receivers) with the goal of measuring the presence of primary transmissions. If a sensing result does not indicate primary usage the measured spectrum may be utilized for secondary access. This type of mechanism is often denoted sensing-based opportunistic spectrum access. The overall objective, simply stated, is to increase capacity as well as individual user throughput.

Briefly, it can be said that collaborative sensing is built on the idea that collecting multiple sensors' information leads to increased probability of detection and reduced false-alarm probability.

Also a distributed algorithm for collaborative adaptive sensing of fields in an underwater environment has been presented.

The idea is in part to, in a distributed manner, form clusters of nodes which jointly process gathered information and control the position of nodes for improved sampling of the field.

There is a constant desire to improve the performance of radio systems. Hence, there is a need for an improved method of sensing in a radio system employing opportunistic spectrum access. The objective is hence to enhance the detection probability, and/or reduce the false-alarm probability of for example other users, in a network.

SUMMARY

It is an object of the present invention to overcome or at least reduce some of the problems associated with the existing methods for sensing in opportunistic spectrum access.

It is another object of the present invention to provide an improved method for determining if a certain radio resource is free to use.

At least one of the above objects is obtained by the present invention as set out in the appended claims. Hence, in a radio system where wireless nodes are in contact, the wireless nodes are enabled to exchange information, with adjacent nodes. In addition distant nodes out of range for direct communication can in accordance with one embodiment be communicated with by forwarding data over multiple hops. The wireless nodes are adapted to perform sensing of at least one radio resource in response to a request from a node. Based on the collective information from at least one other wireless node and its own information a wireless node can make an improved decision on whether a particular radio resource is free to use or not.

In accordance with one embodiment the sensed information is disseminated as Quantized information. For example for each resource, a value, quantized with at least one bit, indicating the estimated probability of that resource being used can be distributed.

In one embodiment, the sensing info nation is time or sequence number stamped.

In accordance with one embodiment a node receiving a sensing request can be adapted to forward the request and also adapted to forward sensing information resulting from the request. Forwarding of sensing information can be limited by flooding constraints or other conditions. For example, a node can be adapted to only forward each message one time. If desired, and in the event a message comprising sensing information can be assumed not to be delivered to the intended node(s), it may optionally be resent up to M number of times.

In accordance with one embodiment a node is adapted to transmit a request for sensing information to other nodes and receive and sensing information from other nodes.

In accordance with one embodiment a node can further be adapted to calculate a probability, based on received sensing information from at least one other node, whether a particular radio resource is free to use or not. A decision to use a particular radio resource can then be based on the calculated probability.

Hereby a reactive sensing mechanism whereby nodes are requesting other nodes to signal sensing information, such as estimated probability of usage of a radio resource, can be obtained. A request can be triggered based on for example an initial sensing yielding an estimate of a usage probability below a threshold or falling within an interval between two thresholds.

The invention also extends to a method for determining access to a radio resource in accordance with the above.

Hence, a method for controlling access to a radio resource such as a radio channel can comprise one or many of the steps of:

Identify a need for radio access and a need for spectrum sensing,

Initial sensing wherein an initial sensing node performs sensing of at least one resource and determines, implicitly or explicitly an estimate of usage probability (i.e., whether another user, such as a primary user, is using the resource) for the at least one resource, Reactive mode triggering wherein, if the sensing information, such as a usage probability, falls below a threshold, or falls within an interval between two thresholds or meets any other predetermined criteria, a measurement request is broadcasted over a channel such as the signaling channel for the at least one resource. The measurement request can specify where/by whom and when the usage detection should take place. Optionally, the triggering may be conditioned on the need to send data in combination with insufficient available current resources.

Request message forwarding wherein any node receiving the measurement request forwards it further to adjacent nodes adhering to time and location constraints given by the request message, Request initiated sensing wherein nodes receiving the request message follow the instructions in the message and perform measurements (sensing) to determine their own estimates of the usage probability for the radio resource or some related measure, Reply message response wherein nodes return a reply message to the requesting node conveying the sensing result such as an estimate of the usage probability for the at least one resource, Reply message forwarding wherein a node receiving a reply message forwards it further to adjacent nodes towards the request message originating node, Multi-sensor sensing of usage, wherein based on the sensing result such as an estimate of usage probability conveyed in the reply messages, the requesting node computes an improved estimate of the usage probability.

BRIEF DESCRIPTION OF THE DRAWINGS

The present invention will now be described in more detail by way of non-limiting examples and with reference to the accompanying drawings, in which.

DETAILED DESCRIPTION

In the examples below dissemination of a probability based metric is used to exemplify the sensing information. However the invention is not limited to dissemination of such a metric. Any sensing information can be disseminated including direct measurement results.

Consider a node v and channel/resource k. Node v performs initial sensing on channel k and determines an estimate $P_{v,k}$ of the usage probability on k based on at least the result of the sensing operation. The usage probability can for example relate to a primary user or another user. The value $P_{v,k}$ is a representation of node v's confidence in current usage of k. For example, a value close to one can represent strong confidence that k is used. An intermediate or low value, for example, as determined from a weaker or absent signal in the sensing operation, may reflect that k is not occupied by a user but can also mean that v failed to detect usage due to shadowing or errors in detection, or that v detected something even when k is not used (spurious emissions, adjacent channel leakage, detection errors, etc).

In general, if $P_{v,k}$ is lower than some threshold value then v may be too uncertain about k's current usage situation to decide to use k itself. This corresponds, e.g., to a situation in which the risk of shadow fading is so large that although a resource is being used a low $P_{v,k}$ can still be obtained. Unless more information is obtained the situation may either lead to higher risks of interference to the primary user (v transmits anyway) or missed opportunities (v is conservative and avoids transmitting).

In some cases the node v may have additional information available so that a very low $P_{v,k}$ can be interpreted as a high probability of no usage. This corresponds, e.g., to a case in which knows that there are good propagation characteristics to the primary user. Then the uncertain situation described above may arise when $P_{v,k}$ falls within an interval between two threshold values.

In accordance with one exemplary embodiment if $P_{v,k} < U_{v,k}$, or if $L_{v,k} < P_{v,k} < U_{v,k}$, for some threshold values $U_{v,k}$ and $L_{v,k}$, then a measurement request is broadcasted from node v over a signaling channel for the at least one resource k.

Figure 1:
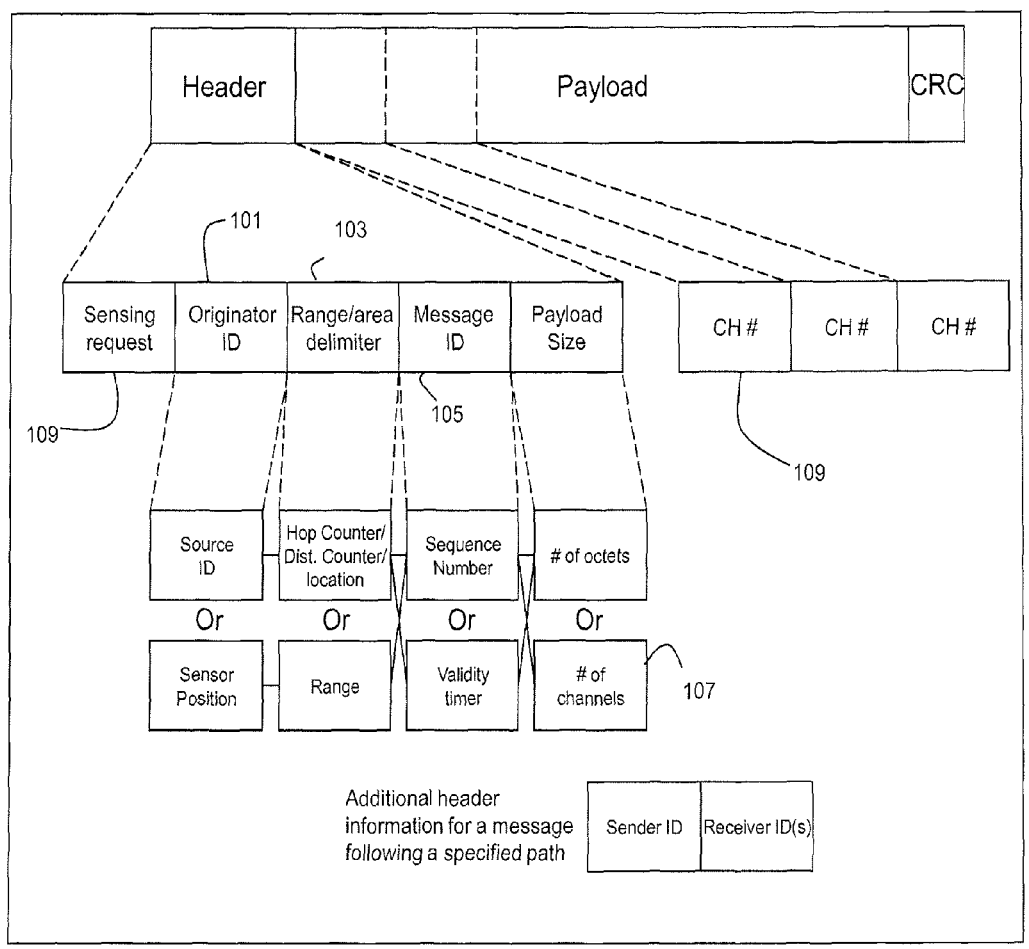
FIG. 1 is a view of an exemplary measurement request message.

A measurement request can be formatted in various ways; some examples are illustrated in FIG. 1.

As shown in FIG. 1, the message can for example comprise fields 101 indicating the originating node and/or a field 103 corresponding to a range or area delimiter such as a hop counter or similar. The message can also have a message identification 105 and a field 107 indicating the number of particular radio resources/radio channels to which the request is related. The message further comprises fields 109 for the respective channels. The message can preferably also indicate that the message is a sensing request message in a field 109.

Also, the request message can specify system or protocols that the transmitter suspects could be at some channel. A predefined list, that is, a number comprising a few bits, may be conveyed in the request message to identify and guide the receiving sensing node in how to perform the estimation procedure.

The request message can also instruct the sensing nodes more directly on which methodology of sensing they should use, for example, cyclostationary, energy detection, etc.

It may include suggested values for detection thresholds and similar parameters which can aid the detection process.

A node receiving a measurement request can be adapted to forward the message further to adjacent nodes. Forwarding can be conditioned on time and location constraints contained in the request message.

The request message forwarding can be accomplished in several ways, for example, but not limited to:

Broadcasting: The message is forwarded according to an available predetermined broadcast tree path.

Flooding: The message is forwarded, under some constraints, by all users overhearing a new message.

The determination of broadcast trees, is a well known in the art and is outside the scope of this present invention. It can be beneficial to use broadcast trees if they are available. They could, for example, be determined to improve reliability for example by lowering the probability of message collision.

In the case flooding is used it is possible to simplify the reply message forwarding as described below by constructing a reverse broadcast tree. For example, each node can remember from which other node it got the request message, and a next-hop identifier (ID) (receiver ID) can be included in the reply message forwarding; this enables a node to only forward a reply message if it is the next-hop node of the received message.

In order to increase the likelihood that only relevant request messages are forwarded time and location constraints can be added to the request message (or to individual parts of the request message). The message is in accordance with one embodiment only forwarded by a node if it is determined relevant with respect to any such constraints that may exist.

As sensing measurements mainly have local relevance, forwarding can in accordance with one embodiment be constrained by location. For example, if the nodes know their locations, the request message can be assigned a certain geographic validity. In accordance with one embodiment the message is forwarded as long as an geographic area specified by the message includes the current node.

If nodes are unaware about their location, a hop constraint can be used. For example a counter is initialized in the requesting node's message to N, the maximum number of hops. The counter is updated, for example by decrementing a counter by 1, for each hop. A receiving node only forwards messages for which the hop counter value has not expired, for example for as long as the counter is >0. The hop counter method can be refined to use estimates of geographical distances per hop with the counter initial value now representing the maximum distance for the forwarding process. The estimates can be derived from the received power level, knowledge of the used transmit power, and assumptions of the propagation conditions and similar parameters.

A node that receives a request message can be adapted to follow the instructions in the request message and perform measurements (sensing) to determine its own estimates of the usage probability or some similar sensing result. The instructions will specify which channel/resource (k), or channels/resources (list of k's) to perform sensing on. If the request message conveys an indication of which type of system that is believed to use the resource(s), then the node may use system specific detection methods, either exclusively or in addition to a generic usage detection algorithm.

A node u that has received a request message from a node v and has performed measurements and derived an estimate $P_{u,k}$ of the primary usage probability or some other sensing result, can be adapted to transmit a reply message to convey $P_{u,k}$ or the other sensing result back to the node v.

Each request message sent from a node can be made unique, for example, with a request message sequence number and source ID. Based on including those identifiers it is only needed to report back a sequence of primary usage probability values or other sensing results since the requesting node is aware about what it requested.

Figure 2:
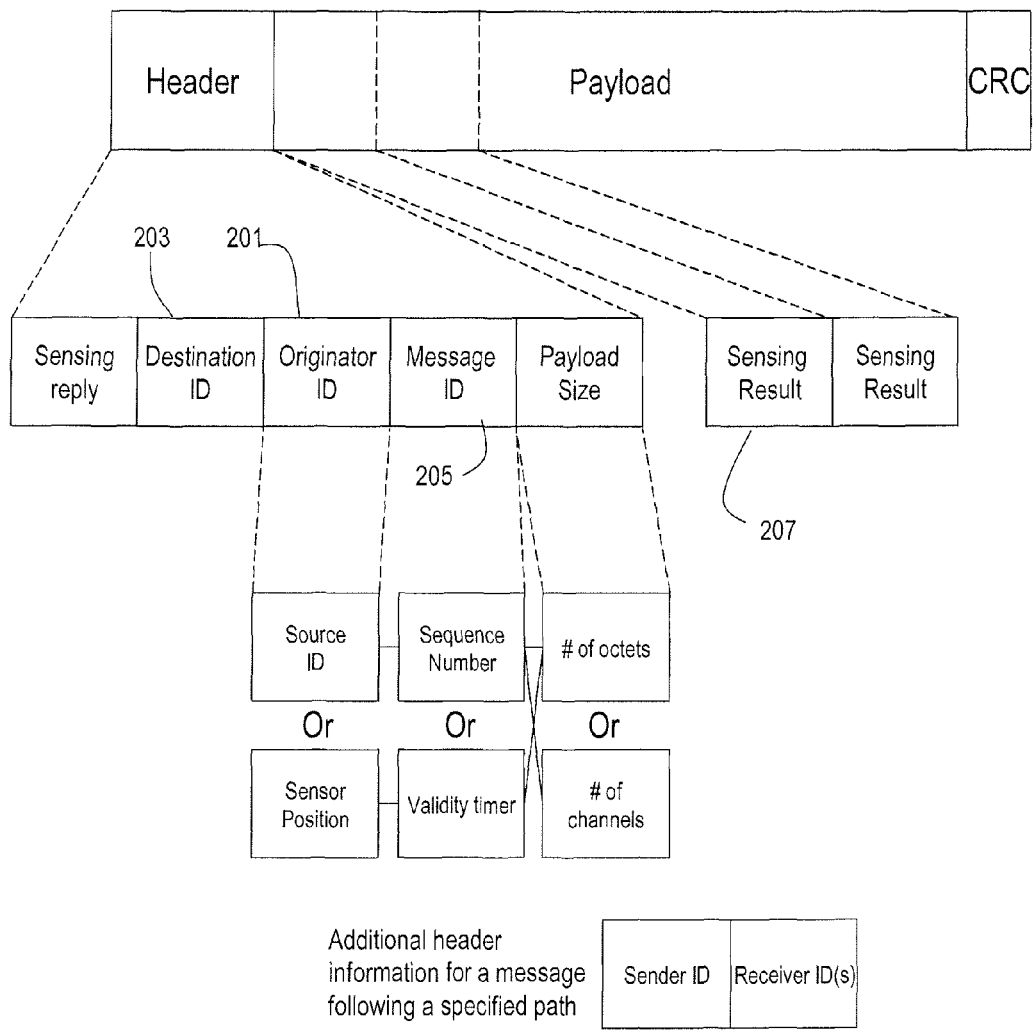
FIG. 2 is a view of an exemplary measurement reply message.

In FIG. 2 a reply message format example is depicted.

The message can for example comprise fields 201 indicating the originating node and or a field 203 corresponding to a destination identifier. The message can also have a message identification field 205 and a field 207 which explicitly or implicitly indicates the probability that a particular radio resources/radio channel is not available for usage. A node receiving a measurement reply forwards it further to adjacent nodes towards the request message originating node. If the request message forwarding has been used to build a reverse broadcast tree, then the reply message forwarding can preferably use this tree as described above. In addition a field corresponding to a range or area delimiter such as a hop counter or similar can be provided. The field can be provided in the same manner as field 103 in FIG. 1.

Based on the above steps, the requesting node v will have received messages from nodes u within some range or area and within some time limit or similar. The messages will convey (quantized) primary usage probability estimates $P_{u,k}$ or some other sensing results for at least channel/resource k. The requesting node v is thereby enabled to compute an improved estimate of the primary usage probability (implicitly or explicitly), and make a detection decision based on that improved estimate.

In one embodiment, an improved estimate of primary usage probability, a fused probability, for a node v that has collected information from a set $V_v$ nodes (or sensors), that primary usage is taking place in channel k near the node can be computed by $$P = 1 - \prod_{u \in V_v} (1 - P_{u,k})$$

The above equation holds provided the estimated probabilities from all nodes (or sensors) are given equal weight and are assumed independent. More elaborate schemes for fusing the information supplied by the different nodes are also possible and are also envisaged by the inventors. If multiple and uncorrelated detection probabilities exist from some individual node, those may all be used to improve the reception performance further.

In accordance with one embodiment if multiple usage probabilities, in particular uncorrelated usage probabilities, exist from some individual node, those may all be used to improve the performance further. In general the sensed detection data and related usage probabilities age, and at some time instant they no longer depict reality appropriately. If the time of measurement is included in the replies, then the values may, in a sense, be forgotten over time by giving older measurements lower weights in a joint measure.

The requesting node v can in accordance with the examples above generate its own initial estimate $P_{v,k}$ as well as the estimates that it has received from other nodes u. An example of detection decision by v can in an exemplary embodiment be as follows:

If most of the replies indicate high usage probability then it is likely that v's initial sensing suffered from shadowing or errors or some other problem, and v can decide that there is usage.

If most of the replies indicate very low primary usage probability then v can decide that there is no primary usage with significantly more confidence than if it only used its own measurement.

The terms most, high, and very low above can, for example, be implemented as threshold values for $P_{u,k}$ and ratios of the number of replies for which the condition holds, but the invention is not limited to this particular decision process using the usage probability replies. In both cases performance is improved by lower risk of interference and fewer missed opportunities.

Figure 3:
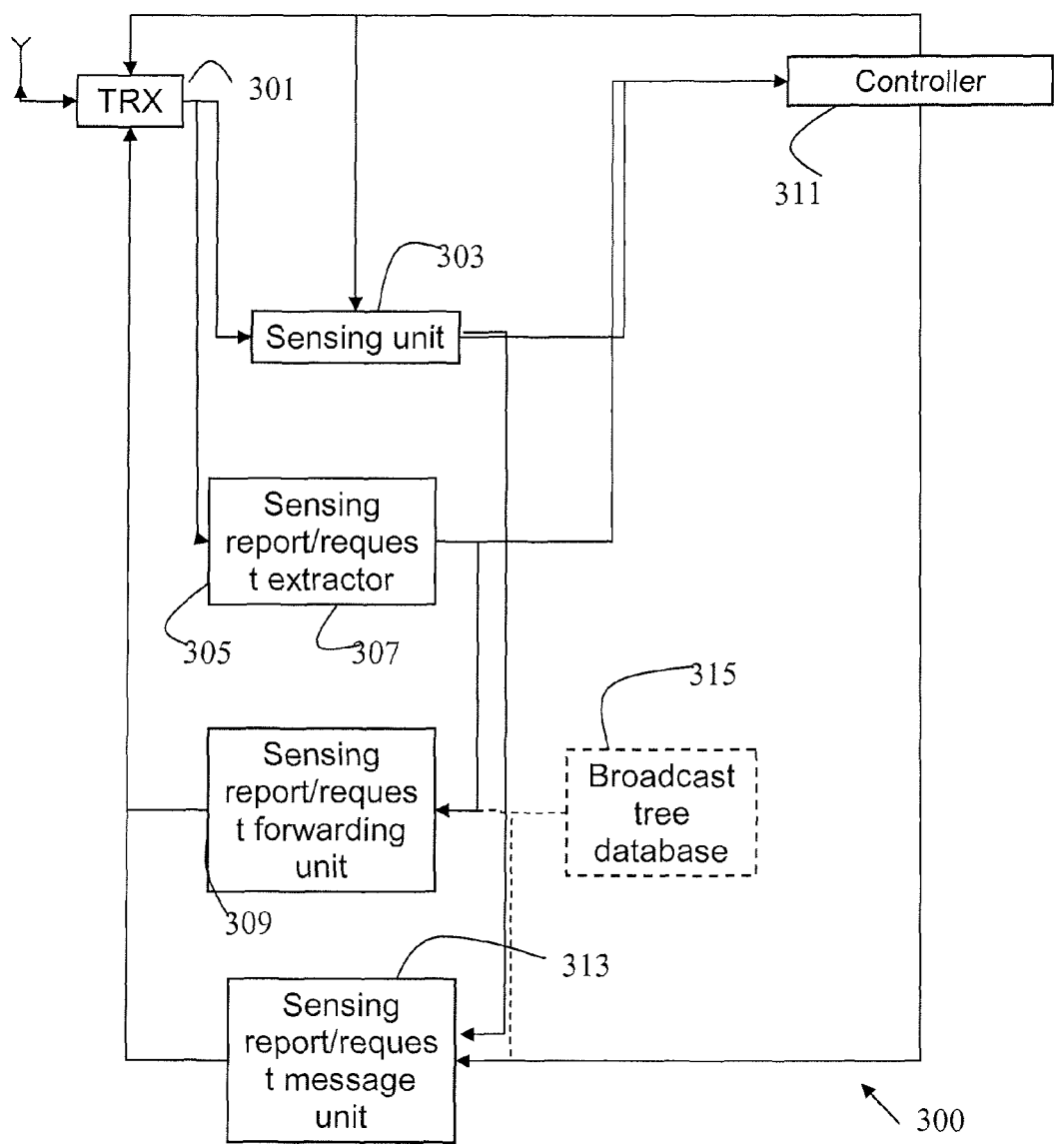
FIG. 3 is a view of a wireless node.

In FIG. 3 an exemplary wireless node 300 comprising different units and modules for performing sensing and control in accordance with the above is depicted.

TRX: Transmit and receive unit 301 for transmitting and receiving data.

Sensing unit: The sensing unit 303 is capable of calculating an estimate of the probability of usage of a resource, based upon at least an own measurement.

Sensing report/request: The sensing report/request unit 305 is adapted to construct a sensing request message containing at least an indicator of a resource to measure.

Sensing report extractor: The sensing report extractor unit 307 is adapted to identify a message from the TRX unit 301 as a sensing report message, to extract the information on the concerned resource(s) and the associated estimates of the probability of usage for the resources, and can also be adapted to forward information to a Data fusion center function in the controller 311 and a Sensing report forwarding unit 309.

ACK/NAK: A unit, (not shown) which can ACK or NAK received Sensing report messages to ensure reliable delivery.

Sensing report/request forwarding unit: The Sensing report/request forwarding unit 309 is a unit adapted to decide whether a received Sensing report/request message should be forwarded or not depending on some forwarding constraints, such as hop count, time, distance, etc, which can be contained in the message. In accordance with one embodiment the Sensing report forwarding unit 309 can be adapted to modify the forwarding constraints as appropriate before passing the message to the TRX unit 301.

Controller 311: The controller 311 is adapted to decide whether a sensing should be requested, the controller can further be adapted to fuse information, i.e. perform a Data fusion center function, from received sensing reports and own sensing, to send sensing results of the node controlled by the controller 311 to a sensing report unit for compilation of sensing reports, to activate the TRX unit 301 and the sensing unit 303 for own sensing, and to identify need for secondary access.

Access use controller: An access use controller can be a part of the controller and can be adapted to decide whether or not to use the resources for which (aggregated) probability of usage estimates have been derived.

Sensing report/request message unit 313. This unit 313 is adapted to construct messages such as the messages described above in conjunction with FIGS. 1 and 2, based on information from the Controller 311.

Network topology database: The network topology database 315 is a database that can be provided to keep track of the network topology, for example, in one (or more) forwarding tables, if the Sensing report messages are distributed in a broadcasting tree.

Figure 4:
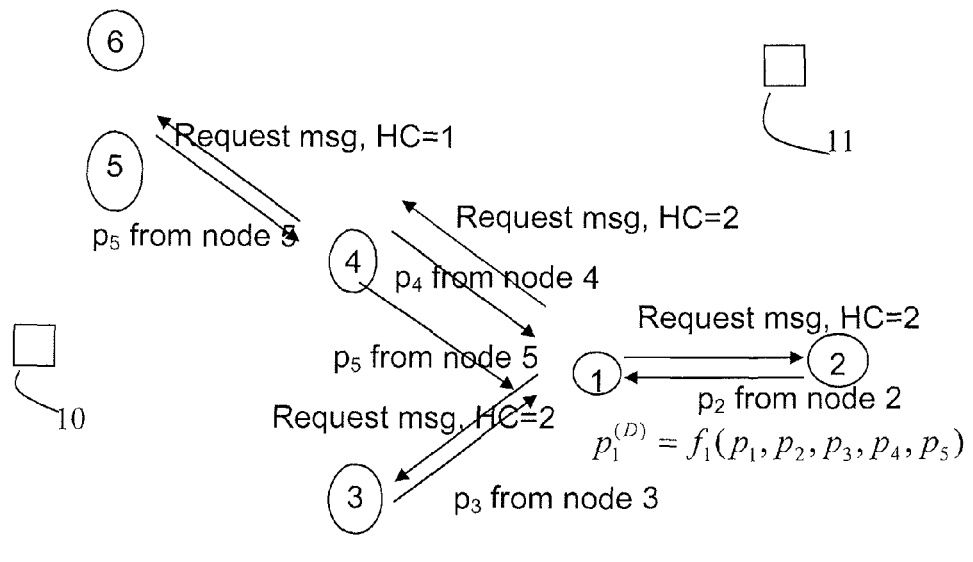
FIG. 4 is a view illustrating an exemplary scenario.

In FIG. 4 an exemplary scenario with six nodes of a radio system, numbered 1 to 6 is depicted to further illustrate the use of the nodes and method as described herein. In accordance with the example, there are some other users denoted 10 and 11 from another (or several other) system(s) and it is desired to compute the probabilities of them utilizing at least one resource. In this example, node 1 initiates a spectrum sensing. However, it is not confident enough in its own sensing result (e.g., the probability of usage falls below a threshold as described previously), and it sends out a measurement request message to adjacent nodes. The measurement request message is forwarded up to two hops as can be indicated in the message. This means that nodes 2, 3 and 4 receive the measurement request directly from node 1. The nodes can be set to update the hop counter for example to decrease the hop counter value by one, and forward the message. Node 5 receives the measurement request from node 1 via node 4 with the hop counter value 1. Node 6 is within reach from node 5, but since the measurement request received by node 5 has already made two hops, i.e., the hop counter value reaches 0 if decreased further, node 5 does not forward the request to node 6. Each node which receives the measurement request makes a measurement and forms a local probability of primary use, $p_v$, where v is the node number. The value $p_v$ is then sent back to the requesting node 1, which can fuse the received probabilities $p_v$ and form a updated probability of primary use, $p_1^{(D)}$ based on a function f1 of the received probabilities. The above example illustrates the message propagation in a broadcast tree.

Figure 5:
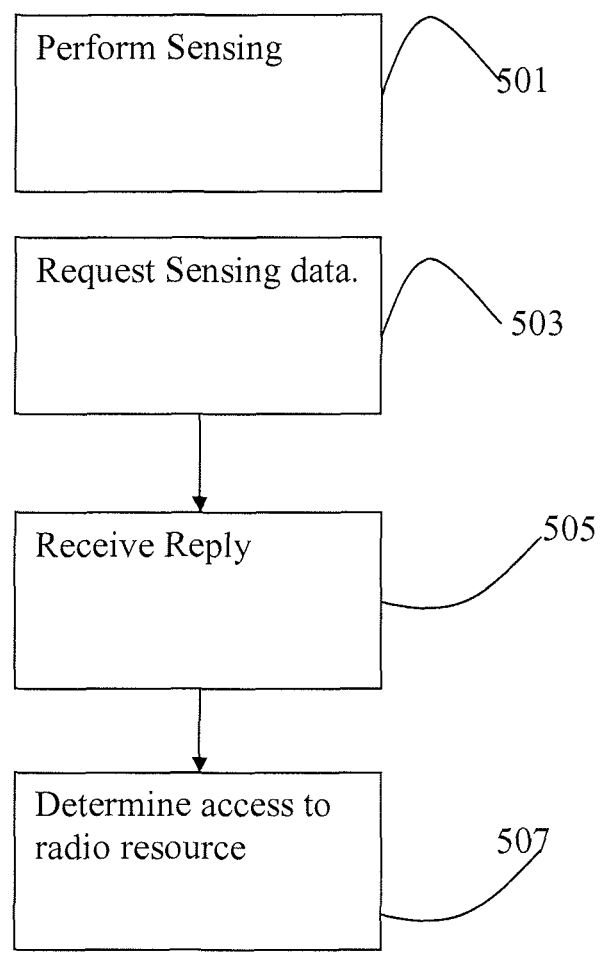
FIG. 5 is a flowchart illustrating some procedural steps when determining access to a radio resource.

In FIG. 5 a flowchart depicting some of the procedural steps performed by a wireless node as described above is shown. Thus, a wireless node for controlling access to a radio spectrum in a radio system is provided. The wireless node is in contact with and exchange information with other wireless nodes of the radio system. The wireless node can perform the following procedural steps. First in a step 501 the wireless node performs sensing of a radio resource by a user in the radio system. If the wireless node sees the need for additional sensing results, then in a step 503 the wireless node transmits a request for sensing information to at least one other wireless node of the radio system. In response to the request a reply is received from at least one other wireless node in a step 505. Based on the reply to the request for sensing information, the wireless node controls access to the radio resource, in a step 507.

Using the method and node as described herein will result in improved primary usage detection performance (i.e., increased probability of accurate detection and reduced false alarm rates). Compared to a system that continuously broadcasts sensing results the method and node described herein will have reduced signaling overhead in a distributed radio network of nodes that sense for users and indirectly identifying spectrum opportunities. The mechanism can, for example, be used among mobile terminals but a fixed node, such as a base station, could also be involved on equal terms as the other nodes.

The invention claimed is:
1. A wireless node for use in a radio system, the wireless node comprising:
 a transmit and receive unit configured to:
  request sensing information of at least one radio resource from at least one other wireless node of the radio system, in response to a determination by the wireless node that a probability that the at least one radio resource is free to use is below a threshold; and
  receive the sensing information of the at least one radio resource from the at least one other wireless node of the radio system;
 a controller configured to determine whether a particular radio resource among the at least one radio resource is free to use based on the sensing information received from the at least one other wireless node; and
 a sensing request forwarding unit configured to use time and location constraints included in a received sensing request message to determine whether to forward the received sensing request message to at least one adjacent wireless node;
 wherein the probability that the at least one radio resource is free to use comprises a first probability;

wherein the controller is configured to determine whether the particular radio resource is free to use by calculating a second probability of whether the particular radio resource is free to use based on the sensing information received from the at least one other wireless node; and wherein the second probability corresponds to a confidence level that is higher than a confidence level of the first probability.

2. The wireless node according to claim 1, wherein the wireless node is configured to exchange information with adjacent wireless nodes.

3. The wireless node according to claim 1, wherein the wireless node is configured to exchange information with other wireless nodes by forwarding data over multiple hops.

4. The wireless node according to claim 1, wherein the sensing information comprises a value, quantized with at least one bit, indicating an estimated probability of the particular radio resource being used.

5. The wireless node according to claim 1, wherein the transmit and receive unit is configured to request the sensing information by transmitting a sensing request message comprising a sequence number.

6. The wireless node according to claim 1, further comprising:

a sensing report forwarding unit configured to determine whether to forward a sensing information reply message received from an adjacent wireless node.

7. The wireless node of claim 1, wherein the controller is configured to determine the first probability before transmitting the request.

8. The wireless node of claim 1, wherein the second probability represents a fused probability of primary usage comprised of the sensing information received from the at least one other wireless node weighted according to a measurement age of the sensing information.

9. A method of determining access to a radio resource in a wireless node, the method comprising:

transmitting a sensing request message comprising a sensing instruction, the sensing request message requesting sensing information of at least one radio resource from at least one other wireless node of the radio system, in response to a determination by the wireless node that a probability that the at least one radio resource is free to use is below a threshold, and wherein the sensing request message comprises time and location constraints that limit forwarding of the sensing request message by the at least one other wireless node;

receiving a reply to the sensing request message from the at least one other wireless node, wherein the reply comprises the sensing information acquired according to the sensing instruction; and determining whether a particular radio resource among the at least one radio resource is free to use based on the sensing information in the reply from the at least one other wireless node;

wherein the probability that the at least one radio resource is free to use comprises a first probability;

wherein determining whether the particular radio resource is free to use comprises calculating a second probability of whether the particular radio resource is free to use based on the sensing information received in the reply from the at least one other wireless node; and wherein the second probability corresponds to a confidence level that is higher than a confidence level of the first probability.

10. The method according to claim 9, wherein transmitting the sensing request message comprises transmitting the sensing request message to an adjacent wireless node.

11. The method according to claim 9, wherein receiving the reply comprises receiving the reply after the sensing request message is forwarded over multiple hops.

12. The method according to claim 9, further comprising: disseminating the sensing information as quantized information.

13. The method according to claim 9, further comprising: time stamping or sequence number stamping the sensing request message such that transmitting the sensing request message comprises transmitting the sensing request message with a time stamp or sequence number.

14. The method according to claim 9, further comprising: forwarding a received sensing request message to an adjacent wireless node.

15. The method according to claim 9, further comprising: forwarding a sensing information reply message to an adjacent wireless node in response to receiving a request from another adjacent wireless node.

16. The method according to claim 9, further comprising: determining to use the particular radio resource based on the calculated second probability.

17. The method of claim 9, further comprising: determining the first probability before transmitting the sensing request message.

18. The wireless node of claim 9, wherein the second probability represents a fused probability of primary usage comprised of the sensing information received from the at least one other wireless node weighted according to a measurement age of the sensing information.

19. A wireless node for use in a radio system, the wireless node comprising:

a message unit configured to request sensing, via a request message, of at least one radio resource from another wireless node of the radio system, in response to a determination by the wireless node that a probability that the at least one radio resource is free to use is below a threshold, wherein the request message comprises a sensing instruction, and further wherein the request message comprises time and location constraints that limit forwarding of the request message by another wireless node; and a controller configured to receive sensing of at least one radio resource from another wireless node of the radio system, and to determine if a particular radio resource is free to use based on collective sensing information acquired from at least one other wireless node according to the sensing instruction;

wherein the probability that the at least one radio resource is free to use comprises a first probability;

wherein the controller is configured to determine whether the particular radio resource is free to use by calculating a second probability of whether the particular radio resource is free to use based on the collective sensing information received from the at least one other wireless node; and wherein the second probability corresponds to a confidence level that is higher than a confidence level of the first probability.

20. The wireless node of claim 19, wherein the controller is configured to determine the first probability before controlling the message unit to request the sensing.

21. The wireless node of claim 19,
wherein the second probability represents a fused probability of primary usage comprised of the sensing information received from the at least one other wireless node weighted according to a measurement age of the sensing information.

\* \* \* \* \*